March 3, 1970

P. C. BARRETT ET AL 3,498,321

SELF-SEALING VALVE ASSEMBLY

Filed Oct. 16, 1967

INVENTORS
Paul C. Barrett
Robert J. Kolar

BY Harry F. Pepper, Jr.

ATTORNEY

# United States Patent Office 3,498,321
Patented Mar. 3, 1970

3,498,321
SELF-SEALING VALVE ASSEMBLY
Paul C. Barrett, Kent, and Robert J. Kolar, Akron, Ohio, assignors to The General Tire & Rubber Company, a corporation of Ohio
Filed Oct. 16, 1967, Ser. No. 675,461
Int. Cl. F16k 15/14
U.S. Cl. 137—525         4 Claims

ABSTRACT OF THE DISCLOSURE

The invention relates to a self-sealing valve assembly in which the control element consists simply of a cylindrical elastomeric sleeve positioned relative to the fluid conduit to be controlled, so that a portion of the outer surface of the sleeve is forced against the end of the conduit.

BACKGROUND OF THE INVENTION

In a fluid system in which valves are employed to regulate flow of the fluid in the system, satisfactory performance of the system depends largely on the proper selection of the type of valve to be used. Many factors are to be considered when making this selection. For example, the relative complexity of the system would necessarily affect a decision to use one, or another, type of valve. The type of fluid used, the variations of the pressure of the fluid, the variations in temperature of the fluid are all factors to be considered when selecting the proper valve type.

Of course, one of the most important considerations affecting the specific type of valve chosen, is the partticular function which it is to perform in the system. The exact kind of control desired is to be determined, and then a valve is selected which will not efficiently achieve this control.

Valves, then, are designed with an eye towards a particular function, with consideration given particularly as to their efficiency. Valves are particularly designed to throttle the flow of fluids, to stop, start, or change the flow of fluids, or as a safety or relief precaution.

Once a particular desired function is determined and the general type of valve required is selected, certain other factors further affect the final valve design. For example, it is desirable that the particular valve selected be easily maintained or replaced. Further considerations, such as expense, many times affect the design of the final valve used. Many time the ease in which the valved area may be cleansed is important.

A particular situation which requires close scrutiny as to a particular valve choice, is one where the valve functions both to permit the flow of fluid in one direction and prevent a reversal of such flow. These values are sometimes referred to as "check" valves. There are many valves of this type, some of simple construction, others of a more sophisticated design. The design selected, of course, depends upon the particularly situation. An example of a simple check valve is what is commonly known as a flap valve, in which the valve member is simply a flap-like element placed over the end of a fluid conduit, which can freely move to an open position in response to a fluid flow through the conduit, and will close in response to a fluid flow in the opposite direction.

In more specific situations, it is desirable that a valve not only prevent a reversal of flow but in addition, that it seal the fluid conduit through which such a flow reversal could occur. Such functions are desirable when employing valves when fluid pressurizing a compartment. It is most often desirable when filling a compartment with a fluid to a certain required pressure, that the compartment be effectively sealed to prevent fluid leakage therefrom. It is further desirable in such instances, that the compartment may be depressurized or partially depressurized when required. Valves of various types have been used in this situation which are generally adjustable to admit fluid to the compartment in one instance, and to seal the compartment from leakage in another instance. The valves can be further adjusted to depressurize the compartment when required.

For an example of a valve assembly to be used in the pressurization of a chamber, reference is made to U.S. Patent No. 3,315,699 to Wurgler et al., which is assigned to the same assignee as the present invention. The valve element in that particular assembly is manually adjustable to a position to permit the flow of fluid under pressure into a chamber. The valve element is designed for further manual manipulation to a sealing position. From this sealing position, the valve element may be manually adjusted when depressurization of the chamber is required. The valve assembly disclosed particularly in said U.S. Patent No. 3,315,699 can also be generally seen in combination with a specific pressurized compartment, when referring to U.S. Patent No. 3,133,575 to Slemmons, which also is assigned to the assignee of the present invention.

Viewing the valve assembly disclosed in U.S. Patent No. 3,315,699 more closely, one can see where certain improvements could be made. It is seen that the valve element, in order to perform its required functions, must be manually manipulated in each case. Also, the valve element itself comprises several individual parts. Valve elements which are made up of a number of parts often cause problems in maintenance and/or repair. With such features in mind, therefore, it would be desirable to substitute a valve element which would not require as many manual adjustments, and would be of a more simple construction so as to require less frequent maintenance, repair, or replacement.

SUMMARY OF THE INVENTION

It is an object of this invention to provide a valve assembly in which the valve element is of a simple construction and automatically performs several of its required functions.

It is a further object of this invention to provide a self-sealing valve assembly in which the valve element can be easily repaired, replaced or maintained It is still another object of this invention to provide a valve assembly which when used in the pressurization of a compartment, automatically adjusts to admit the pressurizing fluid and to seal the compartment after admission of the fluid.

It is still a further object of this invention to provide a valve assembly which both automatically admits pressurizing fluid to a compartment and thereafter seals said compartment, and in which the same valve element is constructed so that its automatic sealing function may be manually overridden.

The valve assembly to which this invention relates features a novel valve element which consists solely of a cylindrical elastomeric sleeve. The sleeve is positioned relative to the end of a fluid conduit so that a portion of its outer surface bears against the end of the conduit to seal the conduit. The sleeve is held relative to the conduit so that the portion of its outer surface, which seals the conduit, bears against the conduit with such force that the sleeve is deformed from its normal cylindrical shape. The fluid flowing through the conduit towards the sealed end will force that portion of the outer surface of the sleeve which seals the conduit away from the end. As long as the fluid flows under pressure, the conduit will remain open, by virtue of the fact that the outer surface of the sleeve remains displaced from the end of the conduit. When the flow of fluid stops, the sealing portion of the sleeve's outer surface will return to its sealing position because of the shape restorative properties inherent in the sleeve. Any fluid exhibiting a pressure tending to reverse the flow of fluid back through the end of the conduit will further aid the sealing function of the sleeve.

When using a valve assembly constructed according to this invention to pressurize a compartment, fluid will be retained under pressure within the compartment, and when it is desired to depressurize the compartment, the automatic sealing feature of the elastomeric sleeve can be manually overridden. Such depressurization can be accomplished simply by manually forcing that portion of the outer surface of the sleeve which seals the conduit away from the end of the conduit. A simple insertion of a rigid finger-like member through the conduit which will force the sleeve way from its sealing position will achieve the desired depressurization.

PREFERRED EMBODIMENT OF THE INVENTION

Referring to FIGURES 1 through 4 in which like numerals in the various figures refer to identical elements, a preferred embodiment of the valve assembly according to this invention will be hereinafter described.

Figure 1:
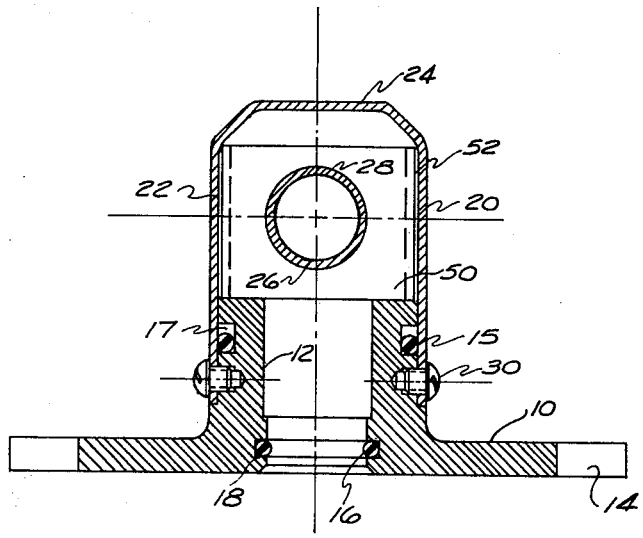
FIGURE 1 shows an elevation of a preferred embodiment of the valve assembly according to the present invention, with parts shown in section.
Figure 2:
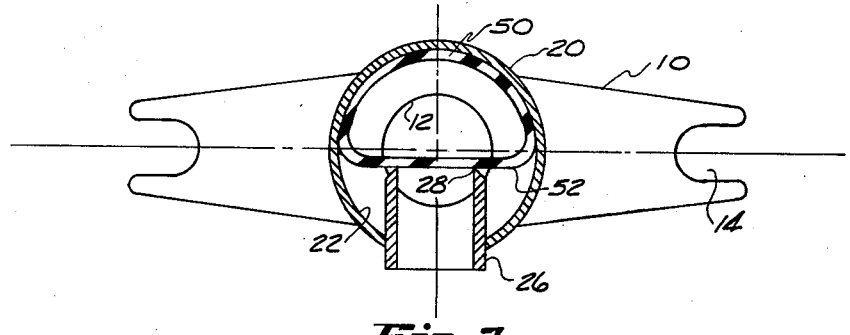
FIGURE 2 shows a plan view of the same preferred embodiment shown in FIGURE 1, with parts in section.

In FIGURES 1 and 2, the valve assembly according to the invention is shown in its preferred form as a pressure fitting. The assembly includes a base member 10 which is provided with a centrally disposed fluid passage 12. The base member 10 is provided with openings such as 14 through which suitable attaching means can register to appropriately mount the base member. The base member 10 is designed with an annular groove 18 located within the passage 12 in which an O-ring 16 is seated. The groove 18 with the O-ring 16 seated therein serve as a fluid seal when connecting the base 10 with a compartment (not shown), which is to be pressurized. Mounted on the base member 10 is a valve housing 20. The valve housing 20 includes an inner cylindrical wall 22 which defines a valve chamber. The housing 20 is mounted on the base member 10 so that the valve chamber and the fluid passage 12 lie on a common axis. The valve housing 20 is fixed to the base 10 by means of suitable screws 30. The housing 20 is in sealed connection with base 10 by virtue of an O-ring 15 seated in an annular groove 17 provided in the base 10. The housing 20 is closed at one end by a frusto-conical cover 24 made integral with the housing 20. The valve housing 20 is provided with a fluid conduit 26 located on an axis normal to the valve chamber defined by the inner cylindrical wall 22. The valve conduit 26 extends into the chamber and terminates as a circular opening or orifice 28. Held between the terminal orifice 28 of the conduit 26 and a portion of the inner cylindrical wall 22 of the valve housing 20 is a normally cylindrical elastomeric sleeve 50. The sleeve 50 serves as the valve, or control element, of the valve assembly.

The sleeve 50 is preferably mounted so that its axis is disposed parallel to the axis common to the valve chamber and the fluid passage 12. As shown particularly in FIGURE 2, the sleeve is also preferably mounted so that a diameter of the sleeve is co-linear with the axis of the conduit 26, thereby making the conduit axis normal to both the sleeve and chamber axes.

Figure 3:
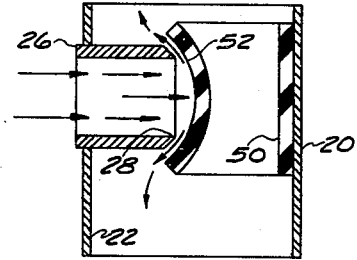
FIGURE 3 is a schematic view showing the valve element of the valve assembly reacting to a flow of fluid in a given direction.
Figure 4:
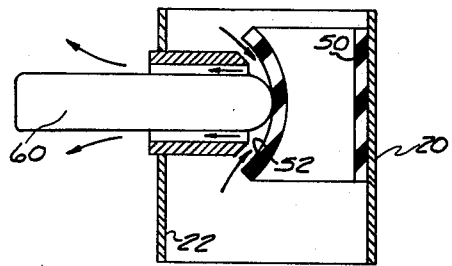
FIGURE 4 is another schematic view depicting the valve element of the valve assembly being adjusted to permit a reversal of fluid flow.

As shown in FIGURE 2, the preferred design of the valve assembly also requires that the fluid conduit 26 terminate within the housing 20, at a predetermined distance from the inner cylindrical wall 22, which is less than the radius of the valve chamber defined by the wall 22. The cylindrical sleeve preferably has a diameter greater than the distance from the terminal orifice 28 to a diametrically opposing portion of the cylindrical wall 22. As seen in FIGURES 2, 3 and 4 a full length portion of the outer surface 52 of the sleeve 50 does not contact wall 22, but is initially flexed to a radially inward deformation so as to seat on the terminal opening 28 of the conduit 26, while the remaining portion of the outer surface 52 contacts the particular portion of the cylindrical wall 22 opposite the opening 28.

The cylindrical sleeve 50 is made of a suitable elastomeric material, the selection of which depends primarily on certain characteristics of the fluid involved. When the fluid is air, a sleeve made of neoprene is found highly satisfactory.

Since the sealing function of the sleeve is due to the tendency of the sleeve to retain its normally cylindrical shape, the sleeve must have a certain stiffness or hardness. The particular hardness of the sleeve depends a great deal upon the pressure requirements of the valve assembly. For example, it has been found that when supplying air at a pressure of 20 p.s.i., the sleeve should be of a rubber having a durometer hardness of 60 Shore D. Also, a sleeve cross-sectional thickness of 0.094 in. is satisfactory for air at 20 p.s.i. Sleeves of varying stiffness and hardness are also possible by reinforcing the rubber with fabric such as cords, yarns or filaments of various natural or synthetic textiles.

Because the sleeve 50 is under a strain when held between the fluid conduit 26 and the housing wall 22, no additional mounting means is necessary to hold the sleeve 20 in its functional position. The sleeve bears against the wall 22 and conduit 26 with a sufficient force to stabilize itself in that position. As a precaution, however, it may be desirable to cement a portion of the outer surface of the sleeve to the cylindrical wall 22 at their area of contact.

The valve assembly is constructed so that it is self-cleaning. The terminal portion 28 of the conduit 26 is chamferred to provide a sharp edge opening as seen in FIGURES 2 through 4. The sealing portion of the sleeve's outer surface 52, when moving to and from its sealing position wipes across the sharp edge to prevent any dirt build-up that might otherwise occur.

The operation of the valve assembly will be described with particular reference to FIGURES 3 and 4. Air indicated by the arrows in FIGURE 3 is supplied through the conduit 26 from a suitable air supply (not shown). The force of the air unseats the sealing valve from the conduit terminal portion 28 and air enters the valve chamber for flow through the passage 12 to a compartment (not shown). When the compartment is filled to the desired pressure, the flow of air is stopped and the valve returns to a sealing position. Back pressure of the air in the valve chamber adds to the sealing force inherent in the sleeve itself. The sleeve may then be manually unseated from the conduit 26 when depressurization is required. For example, the insertion of a blunt-edged tool, such as 60 shown in FIGURE 4, will serve to unseat the sleeve 50. Air will then return through the conduit 60, as indicated by the arrows in FIGURE 4.

Although this novel valve assembly has been shown in its preferred form as a pressure fitting, it is understood that it may take slightly modified forms for use in other situations. It would function well in a closed system as a check valve. Also, it may be used in liquid flow systems, where any or all of its same functions are desired.

It should therefore be understood that the foregoing diclosure relates only to a preferred embodiment of the invention, and that modifications and alterations can be made without departing from the scope of the invention.

What is claimed is:

1. A self-sealing valve assembly for use in regulating fluid pressure within a compartment comprising
   (A) a valve housing including:
      (1) an inner cylindrical wall defining a valve chamber, and
      (2) a fluid conduit disposed along an axis normal to the axis of said chamber, said conduit having
         (a) a terminal orifice within said chamber spaced from said wall
   (B) a valve element mounted within said chamber to open and close said fluid conduit which consists of
      (1) a normally cylindrical elastomeric sleeve disposed with its axis both parallel to said chamber axis and normal to said conduit axis such that
         (a) a first full length portion of the outer surface of said sleeve contacts said inner cylindrical wall, and
         (b) a second full length portion of said outer surface is completely free of contact with said wall, said second full length portion being
            (1) diametrically opposed to said first full length portion and
            (2) seated in sealing relation on said terminal orifice of said fluid conduit.

2. The assembly defined in claim 1 wherein said conduit is provided with a chamferred end defining said terminal orifice.

3. The assembly as defined in claim 2 further comprising:
   (C) a base member provided with a fluid passage therethrough,
   (D) means mounting said housing on said base member such that said chamber is coaxially associated with said passage to permit the flow of fluid therethrough.

4. The assembly defined in claim 1 further comprising:
   (C) a base member provided with a fluid passage therethrough,
   (D) means mounting said housing on said base member such that said chamber is coaxially associated with said passage to permit the flow of fluid therethrough.

References Cited

UNITED STATES PATENTS

| | | | |
|---|---|---|---|
| 529,736 | 11/1894 | Jenness | 137—223 X |
| 531,335 | 12/1894 | Roth | 137—525 X |
| 1,145,853 | 7/1915 | Shelp | 137—161 X |
| 2,475,851 | 7/1949 | Moore | 137—525 |
| 2,684,049 | 7/1954 | Hollis | 137—525 X |
| 2,719,536 | 10/1955 | Stone | 137—525 X |
| 2,925,090 | 2/1960 | Bauerlein | 137—525 X |
| 2,993,654 | 7/1961 | Norton | 137—525 X |
| 3,010,477 | 11/1961 | Graham | 137—516.25 |
| 3,154,940 | 11/1964 | Loomis | 137—525 X |
| 3,416,567 | 12/1968 | Von Dardel et al. | 137—525 X |

FOREIGN PATENTS 899,236   6/1962   Great Britain.

WILLIAM F. O'DEA, Primary Examiner

D. J. ZOBKIW, Assistant Examiner

U.S. Cl. X.R.

137—223

PO-1050
(5/69)

UNITED STATES PATENT OFFICE
CERTIFICATE OF CORRECTION

Patent No. 3,498,321      Dated March 3, 1970

Inventor(s)   Paul C. Barrett and Robert J. Kolar

It is certified that error appears in the above-identified patent and that said Letters Patent are hereby corrected as shown below:

Column 1, line 34, the word "partticular" should be -- particular --. Line 37, the phrase "will not efficiently" should be -- will most efficiently --. Line 50, the phrase "Many time the" should be -- Many times the --. Line 51, the word "cleansed" should be -- cleaned --. Line 59, the word "particularly" should be -- particular --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents